(12) United States Patent
Kephart et al.

(10) Patent No.: US 8,134,724 B2
(45) Date of Patent: Mar. 13, 2012

(54) POLICY BASED SYSTEM AND METHOD FOR OPTIMIZING OUTPUT DEVICE SUBMISSION, USE AND WAIT TIMES

(75) Inventors: Jeffrey Owen Kephart, Cortlandt Manor, NY (US); Jonathan Lenchner, North Salem, NY (US); Frederick Cole Mintzer, Shrub Oak, NY (US); Michael Wilbur Munger, Longmont, CO (US); Jennifer Q. Trelewicz, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 11/685,732

(22) Filed: Mar. 13, 2007

(65) Prior Publication Data

US 2008/0225326 A1    Sep. 18, 2008

(51) Int. Cl.
*G06F 3/12* (2006.01)
(52) U.S. Cl. ............... 358/1.15; 358/1.13; 358/1.14; 358/1.1; 358/1.9; 358/2.1; 705/14.58; 705/14.66; 715/745; 715/747
(58) Field of Classification Search .......... 358/1.15, 358/1.14, 1.13, 1.1, 1.9, 2.1; 705/14.58, 705/14.66; 715/745, 747
See application file for complete search history.

(56) References Cited

U.S. PATENT DOCUMENTS

| | | | |
|---|---|---|---|
| 6,552,813 B2 * | 4/2003 | Yacoub | 358/1.1 |
| 2005/0102442 A1 * | 5/2005 | Ferlitsch | 710/15 |
| 2006/0268318 A1 * | 11/2006 | Lofthus et al. | 358/1.15 |
| 2007/0019228 A1 * | 1/2007 | Rai et al. | 358/1.15 |

* cited by examiner

*Primary Examiner* — King Poon
*Assistant Examiner* — Jacky X Zheng
(74) *Attorney, Agent, or Firm* — Whitham, Curtis, Christofferson & Cook, p.c; Daniel P. Morris

(57) ABSTRACT

Disclosed is a system and method for optimizing submission of output jobs to a network of output devices, using an output job manager to assign jobs to devices. The assignments are done automatically, based on policies associated with users, output devices, organizations responsible for the output devices, and the system as a whole. User output preferences are expressed as one or more user policies. System and organizational constraints associated with users and output devices and the managing of groups of output devices are also expressed as policies. An optimizing scheduler calculates tradeoffs between user preferences, and factors in constraints to optimize submission of jobs to output devices, and to optimize use and wait times on the output devices.

18 Claims, 10 Drawing Sheets

Sample User Printing Policy

- Color Documents: Always print to color printer. Give slight preference to highest possible resolution. Print color documents non-duplex by default.
- All Documents: Trade off one minute of extra walk time for 5 minutes of extra printing time. Print on another floor only as last resort.
- Black and White documents: default to duplex.

Figure 4

Sample Printer Policy & Capabilities

- Postscript
- 16bit color @ 8 ppm (pages per minute), 8bit color @ 16 ppm, 256 greyscale @ 32 ppm, b&w @ 64 ppm
- Landscape or portrait
- Duplex
- Maximum usage: 10,000 pages per day

Figure 5

Sample Site Policy

- No printing documents longer than 200 pages during regular business hours (9-5, M-F)
- No printing documents longer than 200 pages to color printers ever

Figure 6

Sample Business/Organization Policy

- No user may print more than 1000 pages per day
- No user may print more than 5000 pages per month
- No user may have the same print job pending on more than 3 printers at the same time

Figure 7

User with Multiple Printing Policies

- Default Policy
  - Color Documents: Always print to color printer. Give slight preference to highest possible resolution. Print color documents non-duplex by default.
  - All Documents: Trade off one minute of extra walk time for 5 minutes of extra printing time. Print on another floor only as last resort.
  - Black and White documents: default to duplex.
- Confidential Documents (designated at print time by user)
  - Print to registered secure printers (otherwise use default policy)
- Non-Confidential Documents (designated at print time by user)
  - Print to printers not registered as secure (otherwise use default policy)

Figure 8

POLICY BASED SYSTEM AND METHOD FOR OPTIMIZING OUTPUT DEVICE SUBMISSION, USE AND WAIT TIMES

BACKGROUND OF THE INVENTION

1. Field of the Invention

The present invention generally relates to the field of print serving or more generally to the field of servicing output requests of any kind. The invention proposes a solution to the problem of how a client for output services should specify his service requirements such that he can be optimally served given serviceability limitations of the system.

2. Background Description

Modern-day enterprise printing networks are large and complex. They may support thousands of users and hundreds of printers and related physical output devices. Moreover, they are typically dynamic in both their activity and their configuration. Users are continually placing demands on printing resources by submitting jobs, causing device queues to grow and shrink, and printing resources such as paper and ink to become exhausted and then replenished. Devices may fail, and then come back on line. New printers and related devices of varying capabilities may be added to or removed from the network over time.

One important and problematic aspect of the present mode of interaction between users and printing networks is that users must submit their output jobs to specific output devices. Often, the onus (or privilege) of choosing the output device is given to the user. For example, when a user wishes to print a word-processing document or a web page displayed by a browser, they use a menu in the Graphical User Interface (GUI) of the application (e.g. the word processor or the browser) to select the "Print" operation, which presents to the user a graphical window offering one or more choices of output device, along with printing options pertaining to that device. The user selects the desired output device, along with any options that may apply, and then signals through the graphical window that he wishes to submit the job. The request is routed to the device, and if all goes well the job eventually completes on the selected output devices, printed according to the specified options.

Requiring users to select a specific output device up front is problematic because there are many circumstances in which users are not well enough informed to make such a decision. One general class of such situations is when the user is insufficiently informed about output device capabilities and attributes. A common solution is to define a default printer for the computer from which the print job request is generated, or to define a default printer for each of several applications from which print job requests may be issued. Another solution is to take the most recently requested output device as the default. However, this approach does not help with the initial selection of the default output device, nor is it helpful if the user's print job has unusual requirements (e.g. for paper size or print file type), or if the user is in a different office or building than the one in which the default device is situated, or from which the last print request was issued.

One technique that is sometimes used to address the problem of selecting an appropriate printer when there is no useful precedent is to imbed some information about printer location and other attributes in its name, which can then be viewed in the printer selection window. However, this approach is cumbersome, ad hoc, and not as generally informative as is often required. It can also be subject to creating user errors, if the printer is moved to another location before its name is changed to reflect the move.

Even when a user is sufficiently knowledgeable about the capabilities and attributes of various alternative output devices, they may not be sufficiently aware of the present status of those devices. This constitutes a second general type of situation in which the user is unqualified to select the device. For example, the selected output device may have a long queue, causing the user to wait a long time for output, a discovery that is particularly annoying when the user has walked some distance to retrieve output, only to find that a large print job ahead of theirs is only halfway done. In retrospect, the user might have been more satisfied if her print job had been sent to a less-busy printer a little further from her office.

Even worse, the user may discover, upon trying to retrieve her output, that the printer is jammed or out of paper or toner, requiring her to cancel the job and resubmit it to another printer if the problem cannot be cleared up sufficiently quickly. In the latter case, even perfect knowledge of current device status would not avail the user, as the jam could occur after the job request is submitted.

A number of prior art references have teachings related to the above described difficulties. In U.S. Patent Publication No. 2003/0002078 to Toda, et al., a system is disclosed that allows a possibly mobile user to select conveniently located printers, based on route to printer and related information. Toda, however, is only concerned with the location of the printer, and does not consider possible tradeoffs between convenient location and other attributes like print speed, print resolution, and so forth.

In U.S. Patent Publication No. 2004/0190042 to Ferlitsch et al., a method is disclosed for providing enhanced utilization of printing devices by sending portions of a print job to different printers, based on their capabilities. The invention captures the fact that a print job need not be printed on a user-specified printer; however, this reference seeks to optimize the utilization of a cluster of printing devices and does not consider factors at the organization, site and user levels that might lead to a different basis for optimization.

Another prior art reference is U.S. Patent Publication No. 2005/0102442 to Ferlitsch, in which a policy-based method is disclosed for administering printers. This second invention of Ferlitsch discloses a user-defined printer usage administrative policy to select a printer from a pool of printers. While Ferlitsch provides for user specification of printing options, those options are selected from some specific choices. Ferlitsch does not provide a user-defined print policy which is capable of describing the tradeoffs among the desirable printing properties—such as time to print, distance to printer, and print quality. Further, Ferlitsch does not consider distinct preferences applicable to the various organizations that control the printers and to the various sites where the printers are located, nor does he address the flexibility that a user may require when specifying printing preferences over a range of print jobs.

Clearly, there is a need for a comprehensive method that frees users from the necessity of naming a specific output device or following a single policy, and instead determines the output device automatically based upon policies determined by the various stakeholders dependent upon the printer network.

SUMMARY OF THE INVENTION

It is therefore an object of the present invention to provide a method for automatically determining the output device.

Another object of the invention is to free the user from the necessity of naming a specific output device.

It is also an object of the invention to provide descriptions of preferences in terms that allow optimization of output device selection by calculation of tradeoffs among competing preferences.

Yet a further object of the invention is to provide automatic determination of output device based on pre-determined but programmable policies associated with each of the organizations, sites and users of a printer network.

The present invention provides such a method. In a preferred embodiment, the method takes as input a) criteria specified by the user and b) information on the capabilities and static and dynamic attributes of output devices connected to the printing network, and from this automatically chooses an output device and routes the print job to that device. The user criteria may include constraints such as the amount of time the user is willing to wait for output, the distance the user is willing to travel to pick up output, or a preference for type of output (e.g., color or black-and-white), as well as some specification of tradeoffs among these constraints expressed as priorities, rules, or utility functions This disclosure teaches a method for specifying personal printing preferences in the form of tradeoffs amongst competing objectives in one or more personal printing policies. Policies expressing tradeoffs amongst competing objectives may also be presented to the print server by printers, by sites (i.e. groups of users and printers), and by the business as a whole.

The disclosure teaches about a print serving system that satisfies printing requests, or "print jobs," in order to optimally satisfy the competing printing requirements as specified by the policies of users, printers, sites and the business as a whole.

Although in what follows we refer frequently to printers and print servers, the invention applies more generally to arbitrary output devices or output services in lieu of printers and more generally to arbitrary output servers in lieu of print servers. Examples of output devices include FAX machines, multi-function (i.e. print-fax-copy) devices, and audio/video output devices. An output service is any service, either manual or automated, that acts on behalf of an output device by accepting output job requests, producing output, and returning status messages by interacting with the output device. Examples of output services are print servers and FAX servers.

Another embodiment of the invention further includes consideration of other criteria that reflect constraints or preferences of the organization that manages the printing network in the choice of output device. These constraints and preferences could include relative prioritization of job requests from specific users or types of users, or rules regarding the type of jobs that can be submitted to particular devices during specified times of day, etc.

Another embodiment of the invention monitors the progress of the print job, and may under some conditions remove the job from the queue of the originally chosen output device and re-route the job to another device that is deemed more likely to satisfy the criteria.

In another embodiment of the invention, the choice of output device is based upon exact or approximate solution of an optimization, constraint-optimization, or optimal scheduling problem formulated from the input user and/or organizational criteria, resulting in a best overall tradeoff among the expressed preferences of users and the organization and the capabilities of the output devices.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a chart showing a sample user printing policy.

FIG. 5 is a chart showing a sample printer policy & capabilities

FIG. 6 is a chart showing a sample site policy.

FIG. 7 is a chart showing a sample business/organization policy.

FIG. 8 is a chart showing multiple printing policies for a user.

DETAILED DESCRIPTION OF A PREFERRED EMBODIMENT OF THE INVENTION

The following description refers to print jobs executed by printers, but the invention applies more generally to output jobs implemented by output mechanisms, which may be output processes or output devices of many kinds including devices of varying capabilities for displaying output to a variety of permanent media or refreshable surfaces. An "output process" refers to a sequence of automated and/or non-automated steps resulting in the production of some output.

Figure 1:
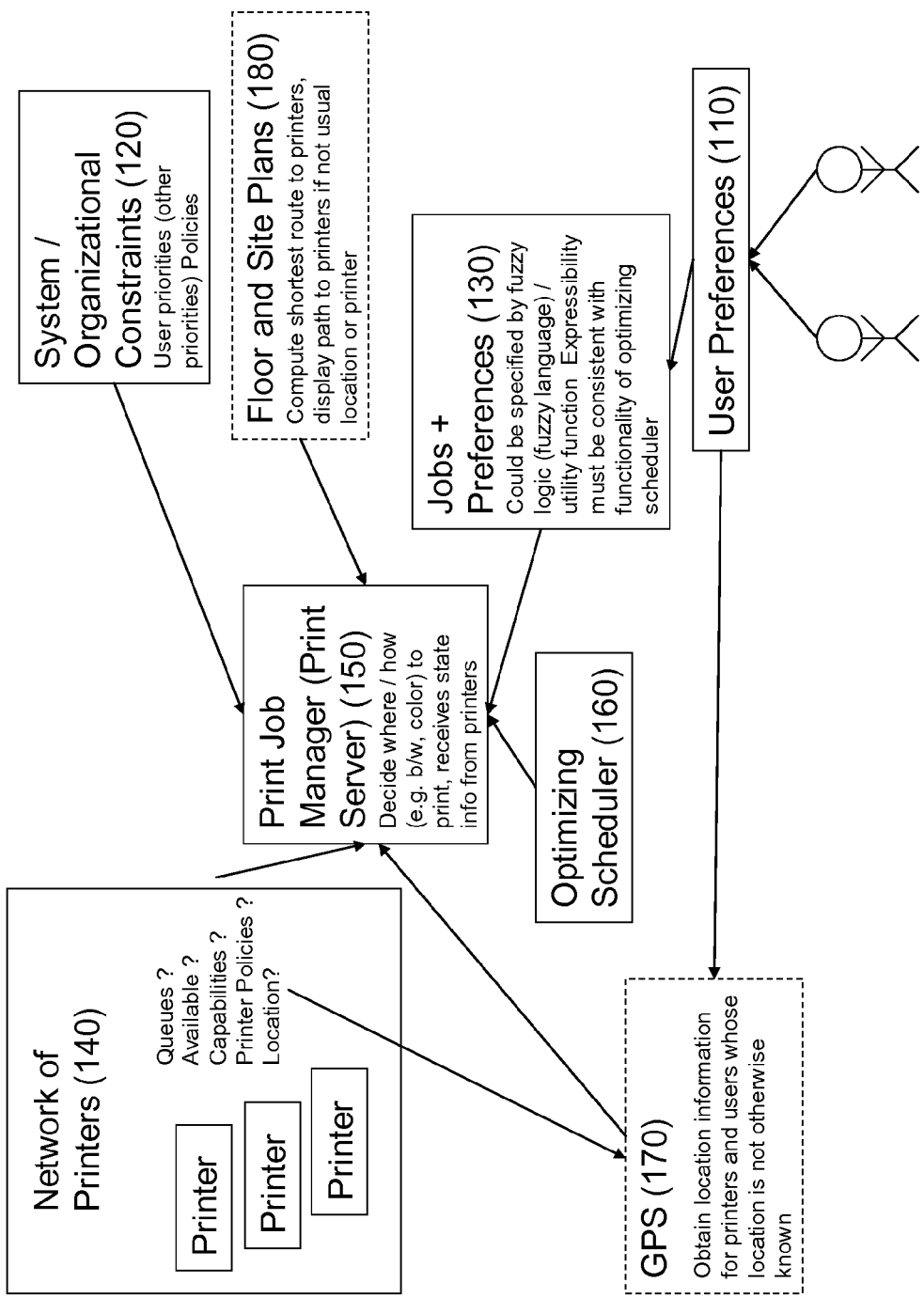
FIG. 1 is a schematic diagram showing the flow of the system in an implementation of the invention with a centralized print server.

Referring now to the drawings, and more particularly to FIG. 1, there is shown the flow of the system in a realization of the invention with a centralized print server. Users manage their preferences 110 in the form of one or more printing policies. Policies may for example, specify that a particular printer should be used for black and white documents and another for color documents, or may specify that one should print to the first available printer on a given floor. A more complete description of the expressive capabilities of user printing policies is included in a subsequent section. When a print job is submitted, the user may optionally select from one or more of his printing policies as depicted in the block called Jobs+Preferences 130. The language within which these policies are expressed (e.g. "fuzzy logic") must be consistent with the functionality of the Optimizing Scheduler 160. In other words, the optimizing scheduler has the ability to understand certain attributes and tradeoffs expressible within a policy and optimally or pseudo-optimally satisfy all the requests placed on it in these terms. It is of no value for a user to express a printing policy, e.g. a tradeoff which is not comprehensible to the optimizing scheduler. The job then gets submitted to the centralized Print Job Manager 150, which decides where and how to print each job under the guidance of the Optimizing Scheduler 160. The Print Job Manager 150 receives state information (e.g. state of job queues, printer availability, printer capabilities, policies applicable to a printer, and printer location) from each printer.

In addition to print jobs and accompanying print policies, the Print Job Manager 150 is constrained by system and organizational constraints 120 and the state and policies of the Network of Printers 140. An organizational constraint may specify, for example, that a given individual cannot print more than 500 pages per day, or that automatic priority should be given to a certain class of users and their jobs over all other users and their jobs. A printer policy may declare that a printer accepts no more than X pages per month, does not accept jobs longer than 150 pages from 9-5, and so forth. More detailed accounts of the expressive capabilities of organizational constraints and printer policies are covered in subsequent sections. In addition to inputs from users, printers, and the overall organizational constraints, the system can optionally get location information about printers or users from a global positioning system or GPS 170 and can get assistance computing walk-times by having access to Floor and Site Plans 180.

Figure 2:
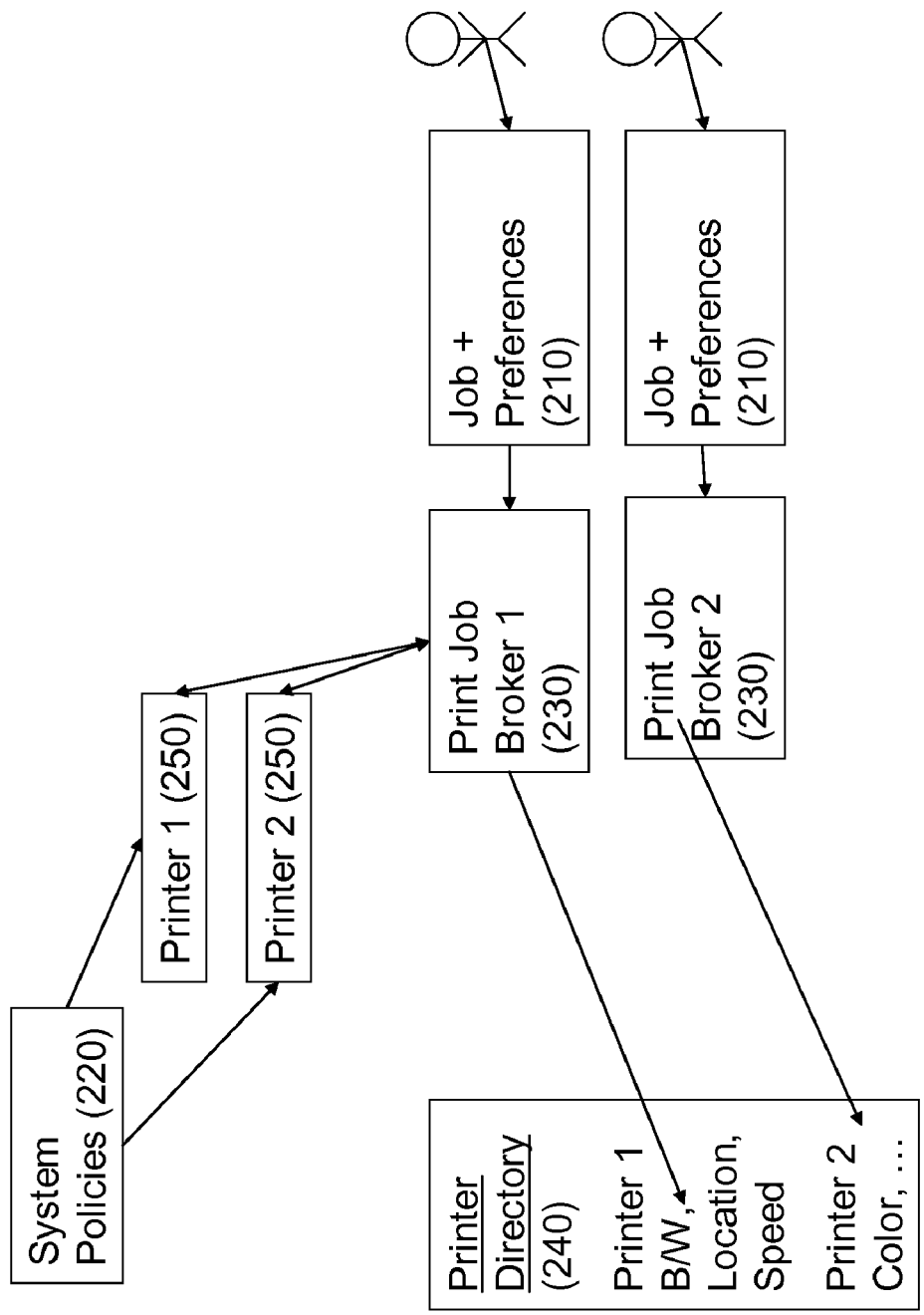
FIG. 2 is a schematic diagram showing the flow of the system in an implementation of the invention with spawning of print job brokers without a centralized print server.

FIG. 2 depicts the flow of a second realization of the invention which does not include a centralized print server, but instead includes the spawning of print job brokers with every print job. As before, users submit their print jobs and preferences 210, but now the print job is handed to a Print Job broker 230 that looks up printers in the printer directory 240 to find those that seem like a good match for the print job. The Print Job broker 230 then surveys the candidate printers to see which can satisfy the print request most "optimally." As in the earlier flow, the printers 250 and system are constrained by printer policies, which may be encoded in the printer directory 240, and overall system policies 220.

The printing system herein disclosed should look very simple to a user. The user should be able to specify the desired attributes of a print job in high-level terms and then receive notification about the output once it is ready. In particular, the user should not need to install special drivers, or worry about file formats or names of printers. The autonomic printing system should resolve all such lower-level details, and should automatically detect and work around problems that might develop as the print job progresses through its various stages of completion. It should do its utmost to carry out the print job in a way that is as satisfactory as possible to the user, while at the same time minimizing the consumption of system resources, optimally trading off user needs with system resource constraints. For example, to satisfy a user need, a job is not simultaneously submitted to all available printers.

Here is how such a printing system might enable such a scenario. First, given a user's need to print a particular document, a print client would obtain from the user a set of desired print job characteristics. Input from the user may be combined with printing defaults supplied at some earlier time by that user, a system administrator, or the application from which the print job is being issued. The form of the print job request should be a high-level policy that expresses what is to be done rather than how it is to be done. For example, rather than specifying a particular printer, the job request should be expressed in terms of desired attributes of the print job, such as the print resolution, in some general sense the location of the printing device (e.g. expressed in terms of maximum distance, walk time, same or different floor, etc.), the paper type, the degree of urgency, etc., along with any additional constraints that are introduced by the application (such as the print file format).

To the fullest possible extent, the desired attributes should not be expressed as hard constraints, as they tend to be in traditional installations. Instead, they should be in the form of soft constraints, or utility functions that indicate a user's tradeoff between priorities, such as, amongst other things, printing time and walk time, or the user's degree of tolerance or appreciation for lower or higher values of print attributes, such as print resolution, or locations that are more or less proximate to the target output location. For example, a utility function could allow a user to indicate that getting output quickly is more important than getting good resolution or color, if tradeoffs must be made.

We anticipate that the elicitation of utility functions will be phased in gradually over time, as preference elicitation techniques become more refined and hence more accepted. In the near-term, soft constraints or utility functions may be built in, or established by administrators on behalf of all users within a domain, and they may be modified only by the most advanced users. Over time, as preference elicitation techniques become more developed, it will become easier for the general user to enter his preferences by answering a few well-targeted questions. But in any event, even in the earliest implementations there ought to be some standard print job request form in which desired print job attributes can be expressed, regardless of the extent to which they are derived from user input.

Once the print client element has the print job request, its next task is to relay the request to the print server (first realization) or, alternatively, to find a Print Job Broker (second realization) that can assume responsibility for arranging for the print job to be done, resolving the details of how the print job is to be accomplished, and verifying that the print job is successfully completed, or that the print job cannot be completed for reasons beyond the Print Job Broker's control (e.g., an error in the print job). One might imagine that the print client could take on such an overseeing role itself. However, assuming that the print client may not be available on a continuous basis, it is also possible to have one or more Print Job Broker elements that specialize in this role situated somewhere in the network.

Figure 3:
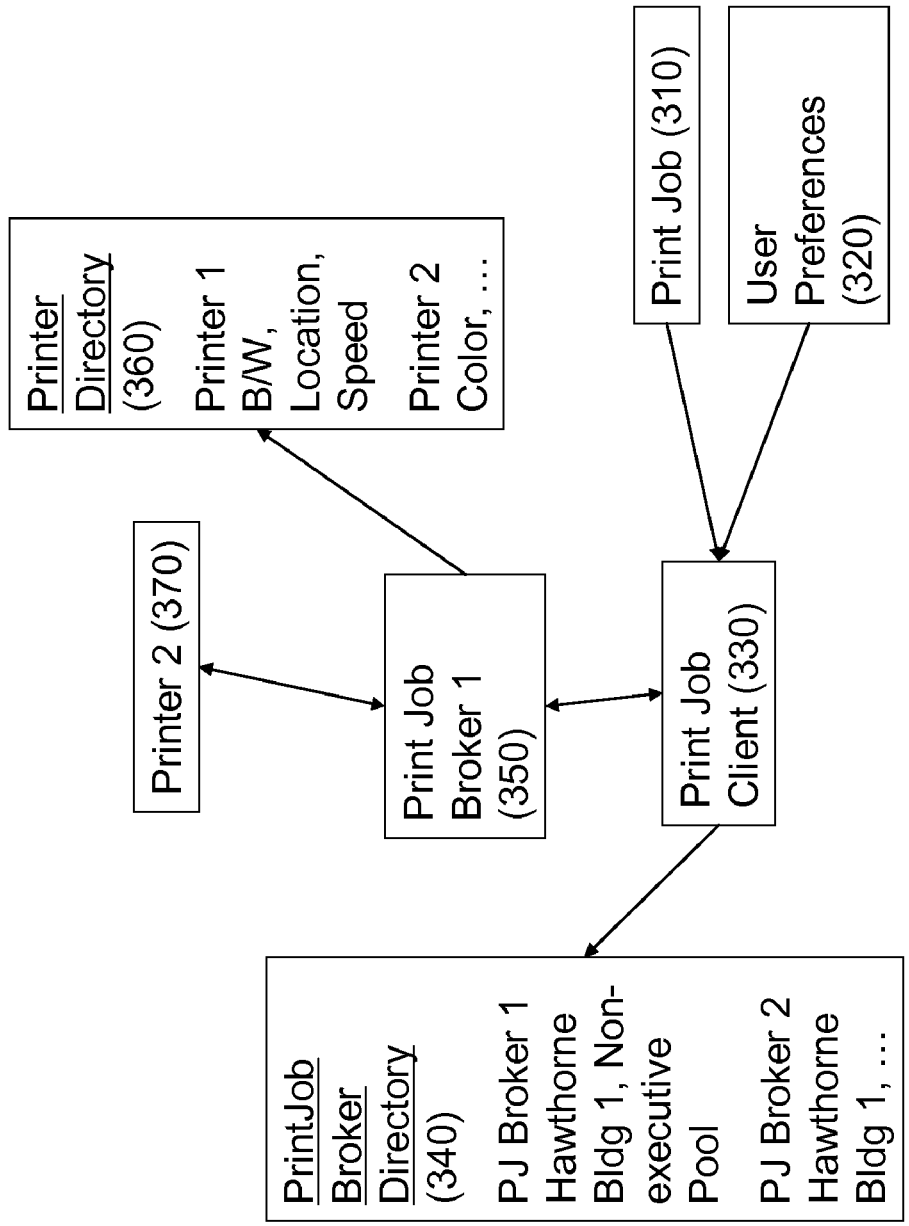
FIG. 3 is a schematic diagram showing interaction between the print job client, print brokers, and printers.

FIG. 3 depicts the Print Job Client 330, which receives the Print Job 310 and User Preferences 320 from the user, querying a Print Job Broker directory 340 service for a list of autonomic elements that offer the Print Job Broker 350 service, possibly with some additional criteria that filter the returned list of elements. If there are no Print Job Brokers 350 that match the specified criteria, the print job client 330 might query the directory 340 for other Printer Directories 360 that might contain pointers to satisfactory Print Job Brokers 350, and then with the contact information for those directories in hand it would query those other directories. The Print Job 310 may now be executed on the located Printer 370.

The Print Job Broker 350 assumes responsibility for ensuring that the print job 310 is completed successfully or aborted, with effort made to satisfy the User Preferences 320 expressed within the print Job 310 request, given whatever resource constraints may exist in the printing system as a whole. Of course the relative priority of the Print Job 310 (as determined from the user's identity or by some other means) would factor into how well the print job 310 that is finally executed corresponds to the user preferences 320.

The Print Job Broker 350 uses the information in the print job 310 request to formulate a query to one printer directory 360 (which may be the printer directory to which the broker has registered, or a printer directory specialized to some particular function on the network) to find one or more printers 370 that are suitable, at least on the basis of their published capabilities. Then the Print Job Broker 350 selects some subset of printers with which to hold a negotiation in which the particulars of the print job 310 request (along with data on the file to be printed) are matched against the capability and availability of each printer. The end result of this negotiation is an agreement with a selected printer 370 on the particulars of the Print Job 310 to be performed.

Once the Print Job Broker 350 establishes a relationship with a printer 370, it maintains this relationship until the print job 310 is performed successfully (in this case, the Print Job Broker 350 relays the pertinent information on the location of the printer 370, the characteristics of the printer 370, etc., to the print job client 330), or an error or failure is reported by the printer 370 or detected by the Print Job Broker 350 (e.g. if the Printer 370 is not responding).

A failure could be as simple as "out of toner" or "out of paper", or it could be more serious, such as a corrupted file or a printer 370 being rebooted without warning. The printer 370 should try to offer the Print Job Broker 340 the most accurate possible indication of what is wrong, but no element should passively wait forever to receive such an error signal, as its partner may fail to detect that there is a problem, or the failure may destroy or incapacitate the element that needs to report the failure. In such situations, the print job broker 350 must make every effort to find an alternative way to get the print job 310 performed successfully, even if this entails restarting the entire process or finding another printer 370.

FIG. 4 describes a sample user printing policy. In this case the user always wishes to print color print jobs to color printers, and when printing color print jobs, he wishes to give a "slight preference" to finding a printer with the highest possible resolution. What this means in precise terms, i.e. in terms quantifiable in a utility function, is application dependent and not the subject of this invention. For example, a slight preference for high resolution may mean that all things being equal, choose the printer with the highest resolution, however, if there is a longer wait, or a longer walk to the printer with higher resolution, print to the printer with lower resolution. We acknowledge the difficulty of getting completely precise utility function tradeoffs from users, and hence there is a need to use fuzzy language to express imprecise tradeoffs that are nonetheless converted to precise expressions inside utility functions. The rest of the policy statement is more precise. "Print on another floor only as last resort" indicates that the user only wants to print on another floor from where they are currently if no printer on the current floor is operational.

FIG. 5 illustrates a sample printer policy and declaration of printer capabilities. The first four bullets are declarations of capabilities; the final bullet is a policy statement, perhaps dictated by the printer warranty.

FIG. 6 illustrates a sample site policy. It is understood in this case, that an organization has various sites or buildings, and that there may be different policies in different locations. In the case illustrated users are not happy about individual users printing long documents during normal working hours. Another site may have a different policy, or a different idea about what constitutes a long document.

FIG. 7 illustrates a sample business or organizational policy. The constraints shown in FIG. 7 apply to users of the organization's printers, but there could also be constraints that apply to the group of printers owned by the organization. Further, there may be more than one level of organization linked by a network of output devices, and each organizational level may specify policies to be applied to its users and output devices.

FIG. 8 gives an illustrative example of a user with multiple (in this case three) printing policies. The first policy is the user's default printing policy. At print time, the user specifies whether to use his policy for confidential or non-confidential documents. Each of these policies is based in turn on the user's default printing policy. The policy for confidential documents says to print to only secure printers and the policy for non-confidential documents says to print to only non-secure printers (it would also be reasonable in this case to print to either secure or non-secure printers). The need for separate printing policies in this case derives from the fact that the print client cannot determine that a document is classified as confidential other than by querying the user.

Figure 9:
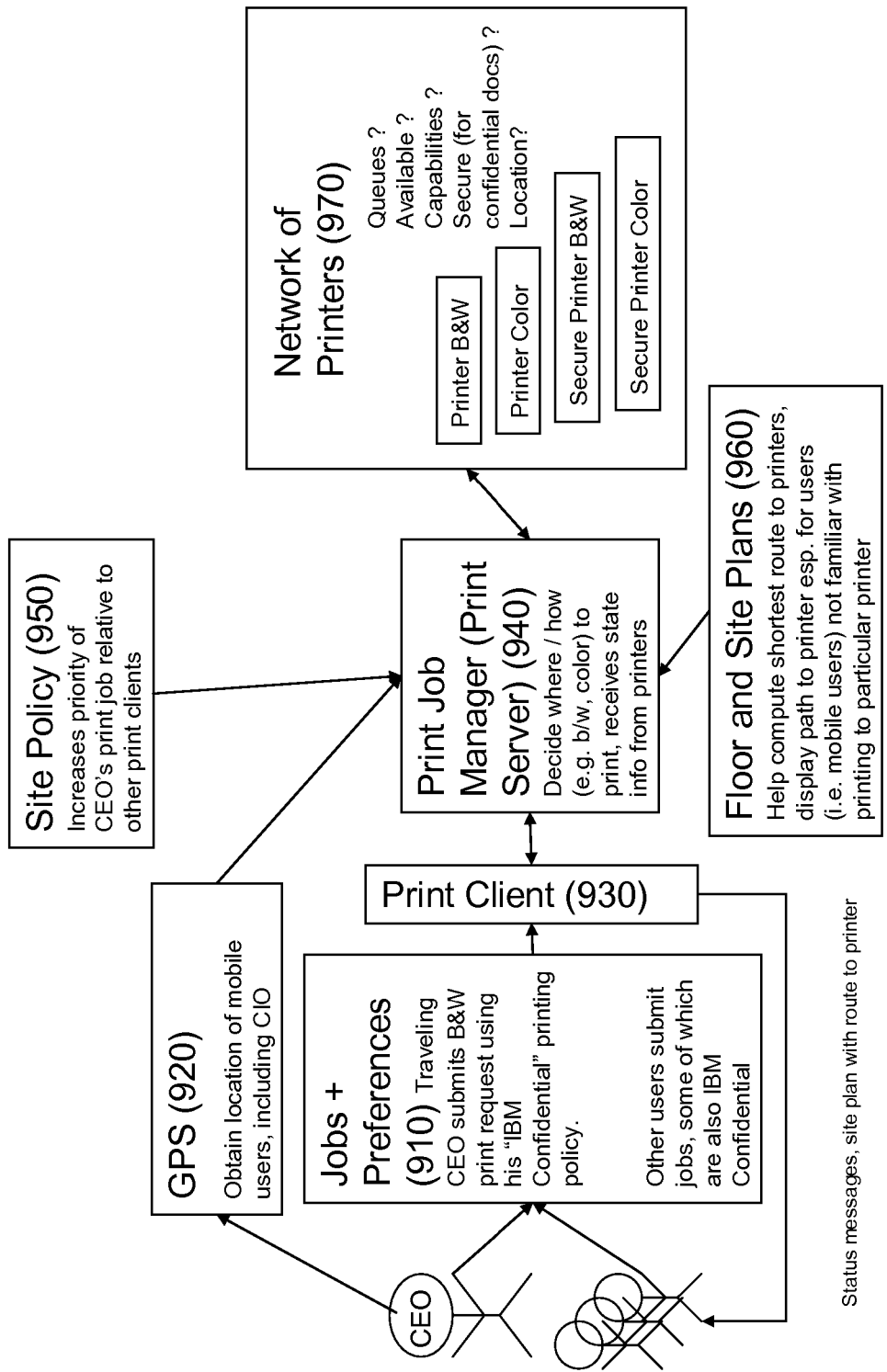
FIG. 9 is a schematic diagram showing a sample flow of a print job from submission to satisfaction of job and notification.

FIG. 9 illustrates a sample flow of a policy-based print request from submission to satisfaction of the request and subsequent notification of the user of job completion. We will trace the submission of a print request from a hypothetical traveling ("mobile") CEO, pictured at the bottom left of the diagram, along with other users submitting similar print requests. In step 910 the CEO submits a request to print a black and white document using his "IBM Confidential" print policy. Without spelling out all details of this policy, let us say that it at least calls for the document to be printed on a secure printer.

At the same time other users are submitting their policy-based print requests (or conventional requests for that matter, the notion of policy-based print requests is completely compatible with a hybrid set of policy-based and non policy-based print clients and print-servers). We assume that some of the requests coming in from other users are also for printing black and white documents on secure printers in the same physical vicinity as the CEO. Since we assume the mobile CEO is not at his local office, his actually physical location is determined using a GPS device 920 somehow attached to himself or his mobile computer.

The print request is then submitted through a Print Client 930. The job of the Print Client 930 is to locate a Print Job Manager or Print Server 940 and transmit the print request to this entity. The job of the Print Job Manager/Print Server 940 is to decide where and how to print. It may also relay back to the Print Client 930 an estimated time to complete the print job which may then be relayed back to the user as s/he is closing the print request dialog box. The Print Job Manager/Print Server 940 queries the secure printers amongst the Network of Printers 970 for their availabilities in accordance with the fine details of the CEO's secure printing policy (i.e. considering tradeoffs between print speed, walk time, resolution and so forth). To compute expected walk times in the tradeoff computation, reference is made to site floor plans 960.

Finally, since the CEO has higher printing priority according to the Site Policy 950, although there are other confidential print jobs queued up that would otherwise be printed sooner on the targeted secure printers, the CEO's print job is printed immediately upon completion of the current active job. If for some reason the print job is stalled or fails, the Print Job Manager/Print Server 940 will automatically switch the print job to run on a newly available secure printer. Upon completion of the print job, the printer from the Network of Printers 970 sends a completion message to the Print Job Manager/Print Server 940 which in turn sends a completion message along with floor plan and mapped out route to the target printer, to the Print Client 930 and ultimately to the CEO.

Figure 10A:
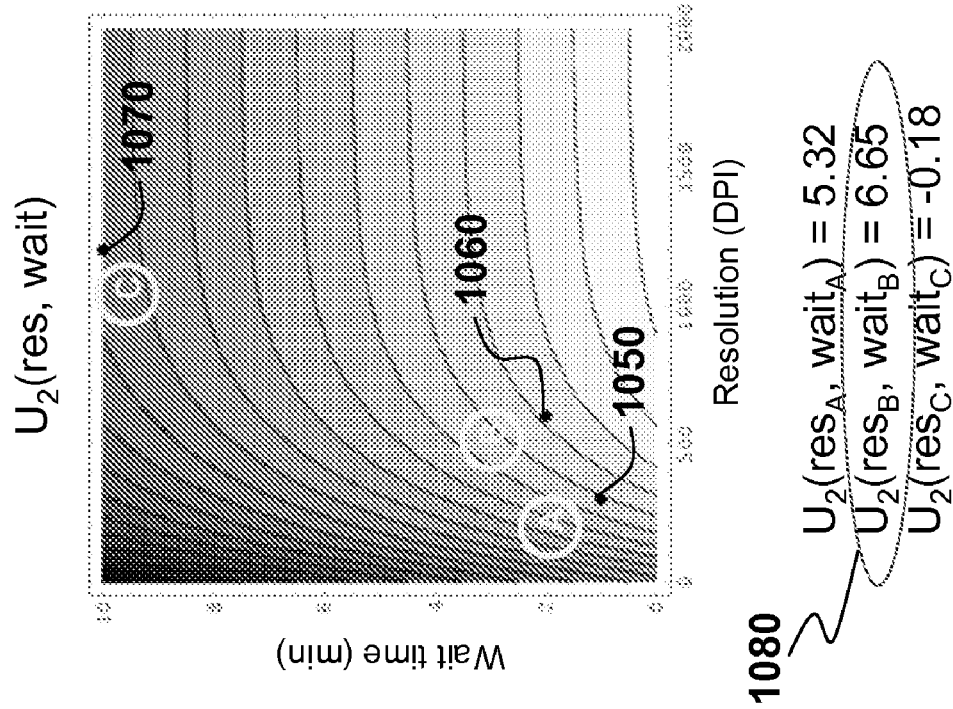
FIGS. 10A and 10B are graphs of utility functions to represent and satisfy soft preferences.
Figure 10B:
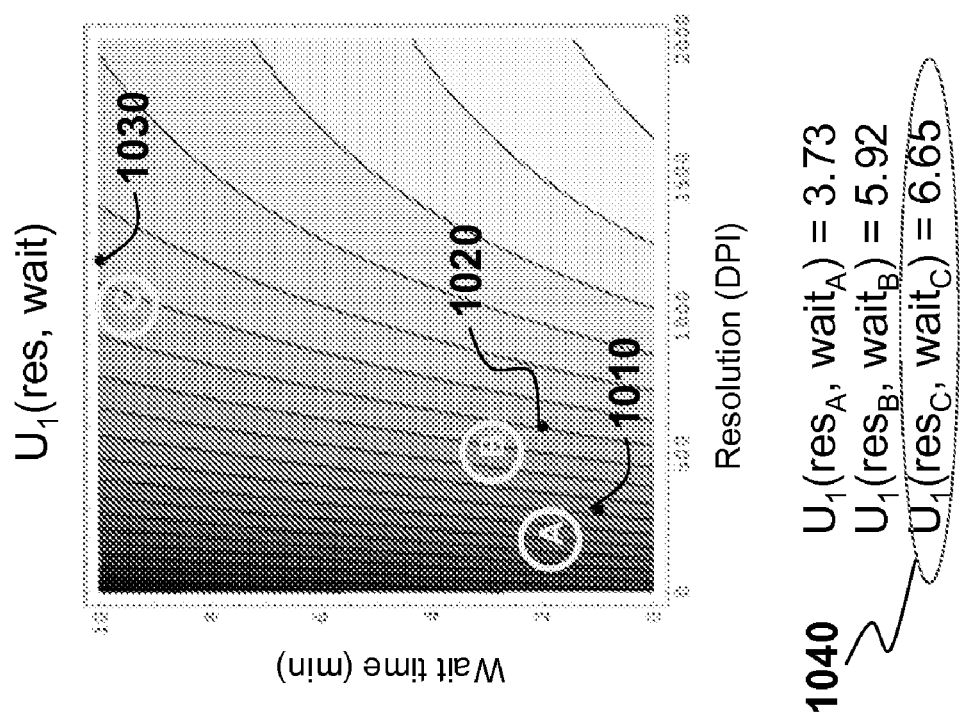

FIGS. 10A and 10B illustrate the use of utility functions to represent and satisfy users' specified printer preferences. For simplicity, we suppose that there are just two criteria of interest: printer resolution and projected waiting time (which includes queuing and printing time). Suppose that User 1 has a utility function $U_1(res, wait)$ as illustrated in the contour plot shown in FIG. 10A. Note that lighter shadings represent higher utility. Mathematically, this utility function is represented as $$U_1(\text{res, wait}) = 10(1-e^{(-res/600)}) - 0.2 \text{ wait,}$$

where res is the resolution in dots per inch (DPI) and wait is the estimated number of minutes before the printout will be available. The first term represents the positive value that User 1 ascribes to print jobs with higher resolution—the value approaches 10 for exceptionally fine resolution, and drops to about 3.9 as the resolution drops to 300 dpi. While User 1 prefers both higher resolution and shorter wait times, the near-vertical contour lines indicate that high resolution is in general the more important criterion for User 1, as he is willing to trade a fairly long wait time for a small gain in resolution. Suppose there are three printers available: A 1010 (with resolution of 300 dpi and a projected wait time of 1 minute); B 1020 (with resolution 600 dpi and a projected wait time of 2 minutes); and C 1030 (with resolution 1200 dpi and a projected wait time of 10 minutes). All three have the same printing speed in pages per minute, so the printing times are identical for all three, leaving queuing time as the only differentiator. Then, since User 1's utility is highest 1040 for Printer C 1030 (as indicated by the lighter color in the contour plot of FIG. 10A, and as shown by the higher utility 1040), Printer C 1030 would be selected automatically on behalf of User 1 by the optimization algorithm.

Now consider User 2, with a different utility function $$U_2(\text{res}, \text{wait}) = 10(1 - e^{(-\text{res}/300)}) - \text{wait},$$

as depicted in FIG. 10B. User 2 is much less tolerant of long wait times than User 1 (since the negative constant (1 in this case) multiplying the wait time is more than for User 2), and her relative need for high resolution is not as strong (although her value for high resolution is also 10, her valuation of 300 dpi resolution is 6.3, which is higher than 3.9). Given these same three printers (A 1050, B 1060 and C 1070), the highest utility 1080 for User 2 is obtained by use of Printer B 1060 (600 dpi), which would be selected automatically by an optimization algorithm on behalf of User 2, as it achieves the maximal value of $U_2$.

Now consider a situation in which there is a third user, User 3, with a utility function identical to that of User 2. User 1's job is estimated to take 5 minutes to complete, User 2's is estimated to take 2 minutes, and User 3's is estimated to take 1 minute. Assume that Printers A, B, and C have queues of length 1 minute, 2 minutes, and 10 minutes, respectively. All three jobs are submitted at approximately the same time. In this case, the optimization problem becomes an optimal scheduling problem, in which an effort is made to find a scheduled allocation of jobs to printers that maximizes the overall utility. In other words, the utility functions are still used, but the type of optimization applied to them is different.

In principle, the scheduler could consider every possible allocation of print jobs to printers, including those in which two or three jobs are sent to the same printer in various orders. However, using simple reasoning, one can narrow the possibilities down to those in which User 1's job is allocated to his preferred printer, C, and the jobs of Users 2 and 3 are allocated in some way to their top two printers, A and B. There are 6 possible allocations to consider: the jobs of users 2 and 3 could be allocated in either order to Printers A or Printers B (4 allocations), or User 2's job could be allocated to A and User 3's to B, or vice versa.

First, consider the case in which Job 2 and Job 3 are submitted to Printer A. If Job 2 runs first, its wait time will be 3 minutes (1 minute for A's queue delay) plus 2 minutes for Job 2 to complete), while Job 3's wait time will be 4 minutes (since it starts just after Job 2 is complete). Thus the combined utility is given by $$U_2(300, 3) + U_3(300, 4) = 3.32 + 2.32 = 5.64.$$

This result and those of the other 5 possible allocations are summarized in the following table:

| Schedule | Utility |
| --- | --- |
| Both on A, Job 2 first | $U_2(300, 3) + U_3(300, 4) = 3.32 + 2.32 = 5.64$ |
| Both on A, Job 3 first | $U_2(300, 4) + U_3(300, 2) = 2.32 + 4.32 = 6.64$ |
| Both on B, Job 2 first | $U_2(600, 4) + U_3(600, 5) = 4.65 + 3.65 = 8.30$ |
| Both on B, Job 3 first | $U_2(600, 5) + U_3(600, 3) = 3.65 + 5.65 = 9.30$ |
| Job 2 on A, Job 3 on B | $U_2(300, 3) + U_3(600, 3) = 3.32 + 5.65 = 8.97$ |
| Job 3 on A, Job 2 on B | $U_2(600, 4) + U_3(300, 2) = 4.65 + 4.32 = 8.97$ |

Out of these six possible schedules, the one yielding the highest utility (9.30) is to run both jobs on Printer B, with the shorter one (Job 3) being run first.

Now suppose that the overall utility scale for User 2 is doubled. One rationale could be that User 2 is an executive of the company and User 3 is a contractor, and the needs of company executives are deemed to be twice as important as those of contractors. This could be implemented either by placing bounds on the maximum utility value that users can define, and allowing executives to have a limit twice that of contractors. Alternatively, the interface by which employees define their utility functions can place a uniform limit on the maximum value of a utility function, but company policies that provide scale factors for each employee may be read into the scheduler, and used to multiply the input utility functions input by each employee. In any case, a similar set of calculations would yield:

| Schedule | Utility |
| --- | --- |
| Both on A, Job 2 first | $U_2(300, 3) + U_3(300, 4) = 2 * 3.32 + 2.32 = 8.96$ |
| Both on A, Job 3 first | $U_2(300, 4) + U_3(300, 2) = 2 * 2.32 + 4.32 = 8.96$ |
| Both on B, Job 2 first | $U_2(600, 4) + U_3(600, 5) = 2 * 4.65 + 3.65 = 12.95$ |
| Both on B, Job 3 first | $U_2(600, 5) + U_3(600, 3) = 2 * 3.65 + 5.65 = 12.95$ |
| Job 2 on A, Job 3 on B | $U_2(300, 3) + U_3(600, 3) = 2 * 3.32 + 5.65 = 12.29$ |
| Job 3 on A, Job 2 on B | $U_2(600, 4) + U_3(300, 2) = 2 * 4.65 + 4.32 = 13.62$ |

In this case, the schedule yielding the highest utility (13.62) is the one in which Job 2 (the important one) is run on its preferred printer, while Job 3 is run on the 300-dpi printer, A. This is slightly better than having Job 3 wait an extra 2 minutes for Job 2 to finish on the 600-dpi printer, B.

While the invention has been described in terms of preferred embodiments, those skilled in the art will recognize that the invention can be practiced with modification within the spirit and scope of the appended claims.

The invention claimed is:
1. A computer implemented system for controlling output mechanisms in an enterprise printing network, comprising:
    means for a user to specify parameters identifying an output job to be executed by said output mechanisms, said job parameters being stated in a job description stored on the network;

a network of output mechanisms for executing said output job, each said output mechanism having a state description and an output policy constraining use of the output mechanism, and each said output mechanism being owned by an organization and located at a site;

means for a user to describe preferences for execution of said output job and tradeoffs among said preferences, said preferences and tradeoffs being stated in a selected one of one or more user policies, said tradeoffs being expressed as priorities, rules, or utility functions comprehensible to an optimizing scheduler;

means for describing constraints applied by said organization to output mechanisms owned by said organization;

an output job manager for assigning said output job to one or more of said output mechanisms in accordance with said selected user policy, said assignment taking account of other output jobs in process, each of said state descriptions, each of said output policies, and each said constraint applied to an output mechanism by an organization;

an optimizing scheduler usable by said output job manager to optimize said assignment by making one or more of said tradeoffs among said user preferences by applying said respective priorities, rules and utility functions; and means for returning notification of completion of an executed output job to said user, wherein
a location of an output mechanism enables computation of a delivery time for the user at a user location to obtain the job output from the output mechanism,
said preferences include at least one time interval between user submission of the output job and receipt by the user of the job output from the assigned output mechanism, and
said tradeoffs include a tradeoff between said at least one time interval preference and another user preference.

2. A computer implemented system as in claim 1, wherein said returning means is a display showing a path between the location of said user and the location of said assigned output mechanism, and wherein said at least one time interval preference is drawn from the set comprising one or more of a projected waiting time and the delivery time, the projected waiting time comprising a queuing time and a printing time, and said another user preference is resolution of the job output generated by the output mechanism.

3. A computer implemented system as in claim 1, further comprising means for describing system constraints to be applied to users of the system and to said network of output mechanisms.

4. A computer implemented system as in claim 3, wherein said system constraints include tradeoffs among two or more system parameters.

5. A computer implemented system as in claim 4, wherein said tradeoff parameters are cost of executing the output job and output mechanism availability, and wherein said tradeoff is calculated by said optimizing scheduler.

6. A computer implemented system as in claim 3, wherein said system constraints include constraints applicable to a group of users or a group of output mechanisms having an identified priority.

7. A computer implemented system as in claim 3, wherein said constraints are stated in one or more system policies.

8. A computer implemented system as in claim 1, wherein one of said output mechanisms is an output process and one of said output mechanisms is from a group consisting of: a high speed paper printer, a color paper printer, a computer output microfilm printer, a display monitor, and a fax machine.

9. A computer implemented system as in claim 1, wherein said optimizing scheduler is able to select a plurality of output mechanisms, each of said plurality being assigned a portion of said output job.

10. A computer implemented method for controlling output mechanisms in an enterprise printing network, comprising:
specifying by a user parameters identifying an output job to be executed by said output mechanisms, said job parameters being stated in a job description stored on the network;
storing on the network a description of user preferences for execution of said output job and tradeoffs among said preferences, said preferences and tradeoffs being stated in a selected one of one or more user policies, said tradeoffs being expressed as priorities, rules, or utility functions comprehensible to an optimizing scheduler;
storing on the network a description of constraints applied to each of a plurality of output mechanisms available on the network for execution of said output job, each said output mechanism having a state description and an output policy constraining use of the output mechanism and being owned by an organization and being available via a directory of output mechanisms;
assigning by an output server said output job to one or more of said output mechanisms in accordance with said selected user policy, said assignment taking account of other output jobs in process, each of said state descriptions, each of said output policies, and each said constraint applied to an output mechanism;
optimizing by said optimizing scheduler said assignment by making one or more of said tradeoffs among said user preferences by applying said respective priorities, rules and utility functions; and
returning notification of completion of an executed output job to said user, wherein
a location of an output mechanism enables computation of a delivery time for the user at a user location to obtain the job output from the output mechanism,
said preferences include at least one time interval between user submission of the output job and receipt by the user of the job output from the assigned output mechanism, and
said tradeoffs include a tradeoff between said at least one time interval preference and another user preference.

11. A computer implemented method as in claim 10, wherein said returning notification provides a display showing a path between the location of said user and the location of said assigned output mechanism, and wherein said at least one time interval preference is drawn from the set comprising one or more of a projected waiting time and the delivery time, the projected waiting time comprising a queuing time and a printing time, and said another user preference is resolution of the job output generated by the output mechanism.

12. A computer implemented method as in claim 10, further comprising describing system constraints to be applied to users of the system and to said network of output mechanisms.

13. A computer implemented method as in claim 12, wherein said system constraints include tradeoffs among two or more system parameters.

14. A computer implemented method as in claim 13, wherein said tradeoff parameters are cost of executing the output job and output mechanism availability, and wherein said tradeoff is calculated during said optimizing.

15. A computer implemented method as in claim 12, wherein said system constraints include constraints applicable to a group of users or a group of output mechanisms having an identified priority.

16. A computer implemented method as in claim 12, wherein said constraints are stated in one or more system policies.

17. A computer implemented method as in claim 10, wherein one of said output mechanisms is an output process and one of said output mechanisms is from a group consisting of: a high speed paper printer, a color paper printer, a computer output microfilm printer, a display monitor, and a fax machine.

18. A computer implemented method as in claim 10, wherein said optimizing selects a plurality of output mechanisms, each of said plurality being assigned a portion of said output job.

* * * * *